United States Patent
Wolf et al.

(10) Patent No.: US 10,179,539 B2
(45) Date of Patent: Jan. 15, 2019

(54) BUILT-IN OPTICAL COMPONENT FOR THE INTERIOR FITTINGS OF AN AIRCRAFT AND CORRESPONDINGLY FITTED AIRCRAFT

(71) Applicant: LUFTHANSA TECHNIK AG, Hamburg (DE)

(72) Inventors: Martin Wolf, Hamburg (DE); Gottfried Arzberger, St. Jakob im Walde (AT); René Buchinger, Neufeld an der Leitha (AT)

(73) Assignee: LUFTHANSA TECHNIK AG, Hamburg (DE)

( * ) Notice: Subject to any disclaimer, the term of this patent is extended or adjusted under 35 U.S.C. 154(b) by 558 days.

(21) Appl. No.: 14/418,722

(22) PCT Filed: Jul. 30, 2013

(86) PCT No.: PCT/EP2013/002242
§ 371 (c)(1),
(2) Date: Jan. 30, 2015

(87) PCT Pub. No.: WO2014/019674
PCT Pub. Date: Feb. 6, 2014

(65) Prior Publication Data
US 2015/0210210 A1 Jul. 30, 2015

(30) Foreign Application Priority Data

Jul. 30, 2012 (DE) .................. 10 2012 213 319

(51) Int. Cl.
*B60Q 3/00* (2017.01)
*B60Q 3/54* (2017.01)
(Continued)

(52) U.S. Cl.
CPC ............. *B60Q 3/54* (2017.02); *B60Q 3/20* (2017.02); *B60Q 3/745* (2017.02); *B60Q 2500/10* (2013.01); *F21W 2106/00* (2018.01)

(58) Field of Classification Search
CPC .... B60Q 2500/10; B60Q 3/004; B60Q 3/005; B60Q 3/02; B60Q 3/0283; B60Q 3/0289;
(Continued)

(56) References Cited

U.S. PATENT DOCUMENTS 6,667,089 B1 * 12/2003 Barker .................. B29C 70/086
  362/147
7,753,563 B2 * 7/2010 Parker ...................... F21V 3/00
  362/311.01

(Continued)

FOREIGN PATENT DOCUMENTS

DE  20 32 514     1/1971
DE  295 13 343    12/1996
(Continued)

OTHER PUBLICATIONS

Espacenet English Machine Translation of FR2794562 and DE19859195, Figs. 3 and 4 of DE 1985195.*
(Continued)

*Primary Examiner* — Zheng Song
(74) *Attorney, Agent, or Firm* — Saliwanchik, Lloyd & Eisenschenk

(57) ABSTRACT

Visible built-in component for the interior fittings of an aircraft, comprising a partially transparent stone layer or glass layer and a luminous layer arranged thereunder for backlighting the stone layer or glass layer, wherein the luminous layer comprises a plurality of luminous strips and a partially transparent intermediate layer is provided between the luminous layer and the stone layer or glass layer.

20 Claims, 2 Drawing Sheets

(51) Int. Cl.
*B60Q 3/20* (2017.01)
*B60Q 3/74* (2017.01)
*F21W 106/00* (2018.01)

(58) Field of Classification Search
CPC . F21V 2200/20; F21S 4/00; F21S 4/20; F21S 4/22; F21S 4/24; F21S 4/26; F21S 4/28; G09F 13/0404; G09F 13/0413; G09F 2013/049; G09F 2013/22; F21W 2101/06; F21W 2101/08; F21Y 2105/001
USPC .................................................. 362/330, 367
See application file for complete search history.

(56) References Cited

U.S. PATENT DOCUMENTS

| | | | | |
|---|---|---|---|---|
| 2002/0093832 | A1* | 7/2002 | Hamilton | F21V 9/10 362/555 |
| 2009/0147504 | A1* | 6/2009 | Teeters | F21V 23/06 362/153 |
| 2010/0061093 | A1* | 3/2010 | Janssen | F21K 9/00 362/235 |
| 2011/0041371 | A1* | 2/2011 | Grauer | A47F 3/001 40/714 |
| 2013/0120969 | A1* | 5/2013 | Rensmo | G09F 13/0409 362/97.1 |
| 2015/0247968 | A1* | 9/2015 | Verrat-Debailleul | G02B 6/0076 362/612 |

FOREIGN PATENT DOCUMENTS

| | | |
|---|---|---|
| DE | 299 12 270 | 1/2001 |
| DE | 198 59 195 | 2/2001 |
| DE | 10 2005 005 682 | 8/2006 |
| DE | 10 2008 059 555 | 4/2010 |
| EP | 1 041 211 | 10/2000 |
| FR | 2 794 562 | 12/2000 |

OTHER PUBLICATIONS

The International Search Report and Written Opinion of the International Searching Authority for PCT/EP2013/002242 in the German language.

English translation of the International Search Report and Written Opinion of the International Searching Authority for PCT/EP2013/002242.

* cited by examiner

BUILT-IN OPTICAL COMPONENT FOR THE INTERIOR FITTINGS OF AN AIRCRAFT AND CORRESPONDINGLY FITTED AIRCRAFT

CROSS-REFERENCE TO RELATED APPLICATIONS

The present application is the U.S. National Stage Application of International Patent Application No. PCT/EP2013/002242, filed on Jul. 30, 2013, which claims priority to German Patent Application No. 10 2012 213 319.4, filed on Jul. 30, 2012, both of which are hereby incorporated by reference herein in their entirety, including any figures, tables, or drawings.

FIELD OF INVENTION

The invention relates to a visible built-in component for the interior fittings of an aircraft having the features of the preamble of claim 1 and a correspondingly fitted aircraft having the features of the preamble of claim 13.

BACKGROUND

Aircraft, and in particular the interior fittings of aircraft, are sometimes designed to be very individual. For example, aircraft are fitted with special aircraft seats, entertainment systems, shower cubicles or the like. For this purpose, some of the interior fittings of the aircraft are newly designed and produced from scratch.

In this case, both the high requirements in terms of quality, aesthetics and functionality and the high aeronautical requirements in terms of stability and safety need to be met at all times. These requirements are high primarily in the case of VIP aircraft, which are not fitted for normal scheduled air services, but are available to presidents or heads of government, for example.

In these aircraft, the visible surfaces of interior fitting components are often designed to have special wooden veneers. DE 198 59 195 C2 also discloses backlighting such decorative layers which are designed as wooden veneers. For this purpose, an electroluminescent film is provided as a luminous layer and is installed directly under the veneer. The patent specification further discloses that the decorative layer could theoretically also be made of stone.

It has, however, become clear that electroluminescent films for backlighting stone layers do not allow bright enough backlighting. The overall visual impression of the backlit visible built-in components does not meet the imposed requirements and thus aircraft cannot be completely fitted as required.

The thickness of the stone layer also cannot readily be reduced as desired in order to increase the backlit effect by the desired degree in a simple manner, since it must also be accordingly robust and break-resistant in order to meet the aeronautical crash requirements.

This problem of the sufficient combination of stability and aesthetics cannot be sufficiently solved by the known visible built-in components or the known aircraft comprising visible built-in components of this type.

The same problem arises when, as an alternative to a stone layer, partially transparent glass is intended to be used, in particular in the case of frosted glass. This may also be designed glass, which may be provided with patterns or decoration.

Accordingly, the problem addressed by the present invention is that of providing a visible built-in component for the interior fittings of an aircraft and a correspondingly fitted aircraft in which the problems described are reduced.

BRIEF SUMMARY OF INVENTION

To solve the problem, according to the invention a visible built-in component for the interior fittings of an aircraft, comprising a partially transparent stone layer or a partially transparent glass layer and a luminous layer arranged thereunder for backlighting the stone layer or glass layer is proposed, in which the luminous layer comprises a plurality of luminous strips and a partially transparent intermediate layer is provided between the luminous layer and the stone layer or glass layer.

Furthermore, to solve the problem, an aircraft comprising at least one visible built-in component which comprises a partially transparent stone layer or a partially transparent glass layer and a luminous layer arranged thereunder for backlighting the stone layer or glass layer is proposed, wherein the luminous layer comprises a plurality of luminous strips and a partially transparent intermediate layer is provided between the luminous layer and the stone layer or glass layer.

In this context, "partially transparent" is understood to mean that the stone layer or glass layer or the intermediate layer are designed such that the illumination arranged behind the layers can still be visually perceived by someone looking at the stone layer. Accordingly, the material is at least partially transparent to the spectral range of visible light, and the light shines through the partially transparent material. Translucent materials which scatter the light passing therethrough are in particular also intended to be understood by "partially transparent materials". Translucent materials are preferred for both the stone layer and the intermediate layer. Corresponding partially transparent glass layers preferably consist of translucent panes of glass. Said panes of glass may accordingly be treated for this purpose, in particular by surface treatment, such as etching or blasting with various abrasives. Furthermore, the glass layer may have different designs, such as patterns or decoration which can locally change the visual properties of the glass layer. In possible embodiments, the glass layer may also be laminated glass; however, single-pane safety glass is particularly advantageous for the visible built-in component. Single-pane safety glass has relatively high impact strength owing to appropriate heat treatment, and shatters only into small fragments, whereby possible injury can be prevented.

In this case, the stone layer may in particular consist of a mineral or a rock, or may at least consist mostly of a mineral or a rock. A mineral is a naturally occurring solid object having a defined chemical composition, whereas a rock is a solid, naturally occurring, generally microscopically heterogeneous amalgamation of minerals, pieces of crushed rocks, glass or residues of organisms. Preferred examples of minerals are quartz, opal, onyx and alabaster. Preferred examples of rocks are granite, basalt and sandstone. The term "stone layer" also includes those composite materials that do not entirely but rather partly consist of stone. Preferably, the proportion of stone material is greater than 30%, preferably greater than 50%, more preferably greater than 70%, for example greater than 90%.

A preferred stone layer is, for example, a composite material made of a major proportion (preferably approximately 60-70% by weight) of gibbsite, an aluminium-containing material from the mineral class of oxides and hydroxides and a proportion (preferably approximately 30-40% by weight) of polymethyl methacrylate. In addition, additional catalysts and other hardeners may be added. A stone layer of this type is known for example under the brand name Corian®.

According to the invention, the luminous layer which backlights the stone layer or glass layer comprises a plurality of luminous strips. In this context, the luminous strips are elongate elements which emit visible light over their entire length or in portions. The luminous strips are preferably LED strips, that is to say strips which comprise LED elements (light-emitting diodes) and are embedded in a support plate. The LED elements are preferably spaced apart by 6 mm to 10 mm, in particular preferably spaced apart by 7 mm to 9 mm.

The support plate and the LED strips embedded therein preferably form the luminous layer. The thickness of the stone layer or glass layer is preferably in a range of between 5 mm to 13 mm, preferably of between 6 mm to 11 mm, more preferably of between 7 mm to 9 mm, for example 8 mm.

According to the invention, an intermediate layer is arranged above the luminous layer, between the luminous layer and the stone layer. This is used to scatter the light emitted from the luminous layer, so that the stone layer can be evenly illuminated and so that the luminous strip arrangement cannot be seen when looking at the stone layer. Without the intermediate layer, the individual LED luminous strips would still be able to be seen through the stone layer by a person looking at it; however, the surface of the stone should preferably be evenly illuminated.

This can be achieved by the combination, according to the invention, of luminous strips and the intermediate layer, and the stone layer as a whole can be sufficiently brightly and also evenly backlit. The stone layer or glass layer is preferably bonded to the intermediate layer. The other side of the intermediate layer is preferably bonded to the luminous layer. Overall, said three layers can be bonded to one another, there being a bonded connection between each of the layers which can be formed by a preferably thin and largely transparent adhesive layer.

Furthermore, it is possible to design the stone layer to be thick enough to be able to meet the aeronautical stability requirements, in particular the required breaking and shatter tests.

The intermediate layer is also preferably made of a polymer, for example of fibreglass or polycarbonate. In particular, it is preferred to bond a honeycomb structure made of a polymer, for example polycarbonate, to a base plate and/or cover plate made of a fibre-reinforced plastics material, for example fibreglass. The base plate and cover plate are preferably between 0.1 and 0.3 mm thick. An epoxy adhesive or a polyurethane adhesive is preferably used as an adhesive. The intermediate layer is preferably colourless. In advantageous embodiments, the base plate and/or cover plate may be white in colour.

This "sandwich structure" provides high strength at a low weight. This sandwich structure is preferably arranged between the stone layer and the support layer, gives the visible built-in component some of its stability and acts as a diffuser for the light emitted from the luminous layer. The intermediate layer thus preferably has a honeycomb structure.

The support plate may preferably also have a honeycomb structure, into which the luminous strips are embedded. Said plate is preferably made of a metal, preferably aluminium, and therefore gives the support layer particularly high stability. In advantageous embodiments, the support plate has a sandwich structure comprising cover layers made of aluminium and a sandwich core made of a structural foam, preferably polyurethane foam. The support plate may comprise grooves for receiving the luminous strips, along which grooves a cover layer and at least parts of the sandwich core are recessed.

The combination of the stone layer or glass layer as an outer layer having corresponding visual or haptic properties with the described intermediate layer and luminous layer therebehind, which retains its positive mechanical properties owing to the support layer or support plate, makes it possible to meet the various aeronautical safety requirements. The combination can be achieved in particular by bonding the layers to one another. It is therefore possible to manufacture a backlit stone layer on a visible built-in component which can withstand static tensile loading, shear loading and flexural loading in accordance with the aeronautical requirements. In particular, impact tests, in particular ball impact tests, can be withstood by the proposed structure of the visible built-in component.

The luminous strips are preferably in parallel. In this way, the luminous strips can be simply arranged side by side in the support plate. Preferably, a plurality of luminous strips can thus be electrically contacted by a transversely extending contact element.

Furthermore, the luminous strips are preferably arranged side by side so as to be equidistant. Owing to the equidistantly arranged luminous strips, the backlighting of the stone layer is more even.

Preferably, the ratio of the distance a between the luminous strips and the thickness d of the intermediate layer is in a range of from 0.5 to 1.5. Owing to this ratio, particularly even backlighting of the stone layer can be achieved. In a preferred embodiment, this ratio is converted and results in the distance a between the luminous strips being in a range of between 19 and 23 mm and the intermediate layer preferably having a thickness d in a range of between 15 mm and 20 mm.

The luminous strips are preferably surrounded by heat-shrink tubing which is shrunk at least in part. The heat-shrink tubing can protect the luminous strips against moisture. In addition, the heat-shrink tubing protects against damage and against undesired slipping of the luminous strips. Preferably, the heat-shrink tubing that is shrunk in part is only shrunk in some portions, so that shrunk and non-shrunk portions alternate multiple times. This is advantageous in particular for the easy insertion of the luminous strip and for preventing undesired slipping. The shrunk portions therefore establish a good connection between the heat-shrink tubing and the luminous strip, whereas the non-shrunk portions may be at a distance from the luminous strip and can be fixed in a groove in the support plate. Said fixing can be achieved by the elasticity of the non-shrunk heat-shrink tubing, which preferably, when not shrunk, has a greater diameter than the width of the groove in the support plate.

The stone layer is preferably designed to be white onyx (opal white). It has become apparent that white onyx gives particularly good results as the stone layer for the visible built-in component. In particular due to the good thermal-shock resistance of the white onyx, the stone layer can meet the requirements of particular "climate tests" and can thus contribute to the production of particularly safe visible built-in components.

The visible built-in component according to the invention preferably comprises not only one backlit stone layer, but a plurality of backlit stone layers, whereby a further improved overall visual impression is produced. For example, at least two mutually parallel stone surfaces are evenly backlit.

For a visible built-in component, in the proposed structure, in particular edges which are produced by two planar stone layers or glass layers which are at an angle to each other can be evenly backlit. The same applies if three stone layers or glass layers are in parallel at a corner.

In advantageous embodiments, the visible built-in component comprises at least two stone layers or glass layers and two luminous layers arranged thereunder, which are at an angle, preferably of greater than 10°, to one another and form a common edge, the luminous layers each comprising a luminous strip at the edge.

At the edge, two luminous strips are thus arranged directly side by side, the orientation of the luminous strips relative to the light emission preferably being at the same angle to one another as the two stone layers or glass layers. This makes it possible to evenly backlight the edge region and corner regions at which a plurality of edges meet. The two luminous strips are preferably arranged side by side in a groove, it being possible for the groove to extend over two adjacent support plates. The two sides of this groove can be formed by two support plates that are at an angle to one another.

BRIEF DESCRIPTION OF THE DRAWINGS

The invention is explained in the following on the basis of preferred embodiments with reference to the accompanying drawings, in which.

DETAILED DESCRIPTION

Figure 1:
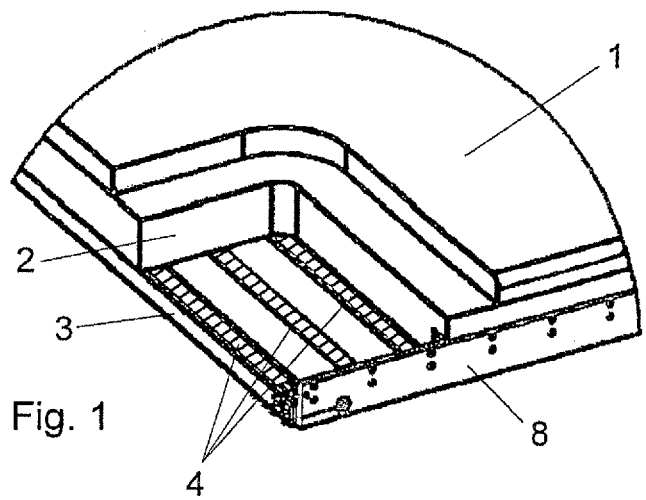
FIG. 1 shows the structure according to the invention of a visible built-in component.

FIG. 1 is an isometric view of the structure of a visible built-in component according to the invention, showing an exposed corner region.

In this embodiment, the visible built-in component is a table element for an aircraft, which comprises at least one backlit stone surface. In the same way, other furniture, walls or even floors can be backlit.

In this embodiment, the stone layer 1 that is visible from the outside is made of white onyx and is approximately 8 mm thick. An intermediate layer 2 is arranged under the stone layer 1 and has a honeycomb structure made of polycarbonate. The luminous layer 3 is arranged under the intermediate layer 2. The luminous layer 3 comprises a support plate, in which a plurality of LED luminous strips 4 is embedded. In this embodiment, the support plate is made of an aluminium/foam/aluminium structure. In this case, a foam material is provided between two aluminium sheets. The LED luminous strips 4 are protected against damage by the foam material.

The LED luminous strips 4 are electrically contacted via a connecting strip 8 which extends transversely to the LED luminous strips.

Figure 2:
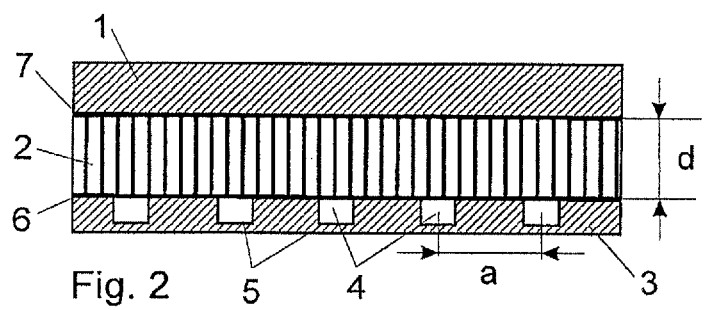
FIG. 2 is a cross section through a visible built-in component according to the invention.

FIG. 2 also shows the grooves 5 in the aluminium/foam/aluminium structure of the support element, in which grooves the LED luminous strips 4 extend. In this embodiment, the distance a between the 6 mm wide grooves 5 or the luminous strips 4 is in a range of between 19 and 23 mm. Attachment means are preferably provided between the grooves.

The thickness d of the intermediate layer 2 is in a range of between 15 mm and 20 mm. In this preferred embodiment, the intermediate layer 2 comprises a 0.2 mm thick base plate 6, a cover plate 7 of the same thickness and a honeycomb structure made of polycarbonate. The base and cover plates 6, 7 surround the honeycomb structure made of polycarbonate and are bonded thereto. In this case, the base plate 6 and the cover plate 7 are also made of a polymer, preferably of a fibre-reinforced polymer, for example fibreglass. The components are bonded to one another by means of an epoxy adhesive.

Figure 3:
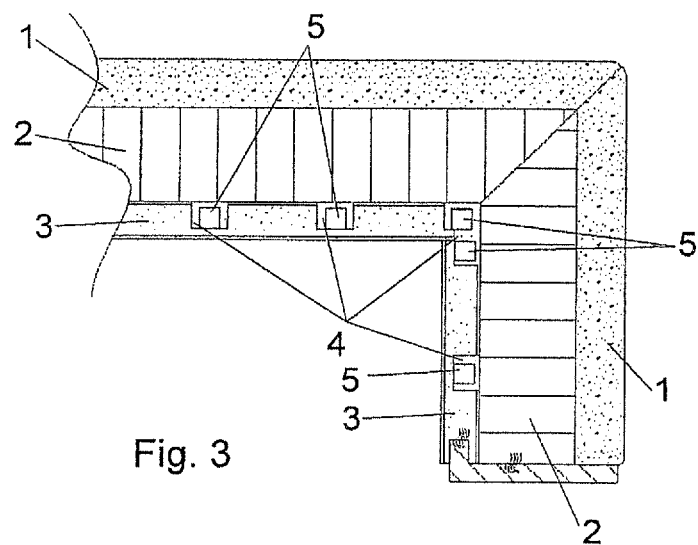
FIG. 3 is a cross section through a visible built-in component according to the invention comprising a mitre joint.

FIG. 3 shows how two backlit stone layers 1 can be connected using a 45° mitre joint. The stone layers 1 are each backlit by a luminous layer 3 comprising LED luminous strips 4 and an intermediate layer 2 acting as a diffuser and are at right angles to one another. Owing to this backlighting, the stone surfaces 1 are each backlit in the same way, and this gives the overall impression of an evenly illuminated stone table. For this purpose, one LED luminous strip 4 is preferably arranged precisely in the corner region of the vertically adjoining luminous layers 3. The stone layer can be backlit more evenly by said LED luminous strips 4 in the corner region.

In a preferred embodiment, two LED luminous strips 4 are arranged side by side in the corner region and improve the even backlighting in the corner region.

Figure 4:
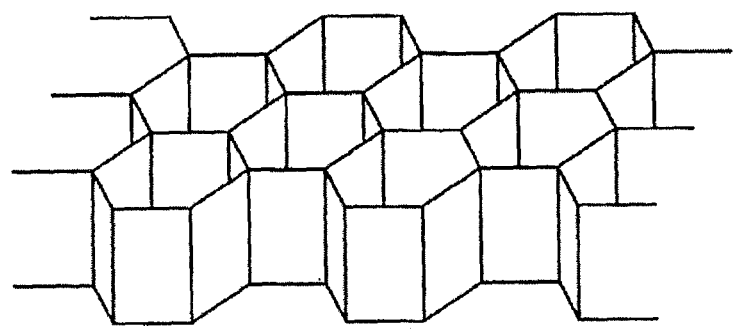
FIG. 4 shows a honeycomb structure that an embodiment of the intermediate layer 2 or an embodiment of the support plate 3 can utilize.

FIG. 4 shows a honeycomb structure that an embodiment of the intermediate layer 2 or an embodiment of the support plate 3 can utilize.

Figure 5:
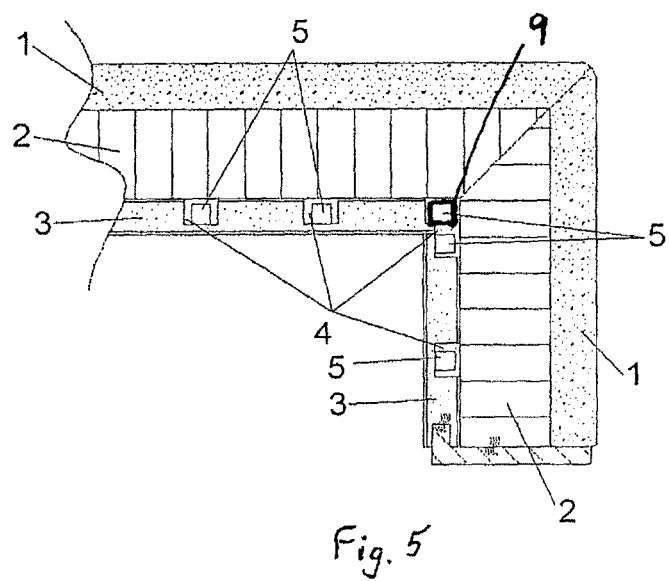
FIG. 5 shows the cross section shown in FIG. 3 with one of the LED luminous strips 4 surrounded by heat-shrink tubing 9.

FIG. 5 shows the cross section shown in FIG. 3 with one of the LED luminous strips 4 surrounded by heat-shrink tubing 9.

EMBODIMENTS

Embodiment 1

Visible built-in component for the interior fittings of an aircraft, comprising a partially transparent stone layer (1) or a partially transparent glass layer and a luminous layer (3) arranged thereunder for backlighting the stone layer (1) or glass layer, characterised in that the luminous layer (3) comprises a plurality of luminous strips (4) and a partially transparent intermediate layer (2) is provided between the luminous layer (3) and the stone layer (1) or glass layer.

Embodiment 2

Visible built-in component according to Embodiment 1, characterised in that the luminous strips (4) are in parallel.

Embodiment 3

Visible built-in component according to Embodiment 2, characterised in that the luminous strips (4) are arranged side by side so as to be equidistant.

Embodiment 4

Visible built-in component according to Embodiment 3, characterised in that the distance a between the luminous strips (4) is in a range of between 19 and 23 mm.

Embodiment 5

Visible built-in component according to any of the preceding Embodiments, characterised in that the luminous layer (3) comprises a support plate, into which the luminous strips (4) are embedded.

Embodiment 6

Visible built-in component according to Embodiment 5, characterised in that the support plate and/or the intermediate layer (2) has a honeycomb structure.

Embodiment 7

Visible built-in component according to any of the preceding Embodiments, characterised in that the luminous strips (4) are surrounded by heat-shrink tubing.

Embodiment 8

Visible built-in component according to any of the preceding Embodiments, characterised in that the intermediate layer (2) is made of a polymer.

Embodiment 9

Visible built-in component according to any of the preceding Embodiments, characterised in that the intermediate layer (2) has a thickness d in a range of between 15 mm and 20 mm.

Embodiment 10

Visible built-in component according to any of the preceding Embodiments, characterised in that the ratio of the distance between the luminous strips (4) and the thickness of the intermediate layer (2) is in a range of from 0.5 to 1.5.

Embodiment 11

Visible built-in component according to any of the preceding Embodiments, characterised in that the visible built-in component comprises at least two stone layers (1) or glass layers and two luminous layers (3) arranged thereunder, which are at an angle to one another and form a common edge, the luminous layers (3) each comprising a luminous strip (4) at the edge.

Embodiment 12

Visible built-in component according to any of the preceding Embodiments, characterised in that the stone layer (1) is designed to be white onyx.

Embodiment 13

Aircraft comprising at least one visible built-in component which comprises a partially transparent stone layer (1) or a partially transparent glass layer and a luminous layer (3) arranged thereunder for backlighting the stone layer (1) or glass layer, characterised in that the luminous layer (3) comprises a plurality of luminous strips (4) and a partially transparent intermediate layer (2) is provided between the luminous layer (3) and the stone layer (1) or glass layer.

LIST OF REFERENCE NUMERALS

1 Stone layer
2 Intermediate layer
3 Luminous layer
4 Luminous strip
5 Groove
6 Base plate
7 Cover plate
8 Connecting strip

The invention claimed is:

1. A visible built-in component for an interior fitting of an aircraft, comprising:
   a partially transparent layer,
   wherein the partially transparent layer is a partially transparent stone layer or a partially transparent glass layer;
   a partially transparent intermediate layer,
   wherein the partially transparent intermediate layer comprises an intermediate layer honeycomb structure, and
   wherein the partially transparent intermediate layer is colourless; and
   a luminous layer,
   wherein the luminous layer comprises a plurality of luminous strips,
   wherein the partially transparent intermediate layer is positioned between the luminous layer and the partially transparent layer,
   wherein at least a portion of visible light emitted by the luminous layer passes through the partially transparent intermediate layer, passes through the partially transparent layer, and exits the partially transparent layer so as to backlight the partially transparent layer,
   wherein the luminous strips of the plurality of luminous strips are arranged in parallel,
   wherein the luminous strips of the plurality of luminous strips are arranged side by side such that luminous strips of the plurality of luminous strips are a distance, a, from adjacent luminous strips of the plurality of luminous strips, and
   wherein a ratio of the distance, a, and a thickness, d, of the partially transparent intermediate layer is in a range of from 0.5 to 1.5.

2. The visible built-in component according to claim 1, further comprising:
   a second partially transparent layer,
   wherein the second partially transparent layer is a second partially transparent stone layer or a second partially transparent glass layer;
   a second partially transparent intermediate layer,
   wherein the second partially transparent intermediate layer comprises a second intermediate layer honeycomb structure, and
   wherein the second partially transparent intermediate layer is colourless; and
   a second luminous layer,
   wherein the second luminous layer comprises a plurality of second luminous strips,
   wherein the second partially transparent intermediate layer is positioned between the second luminous layer and the second partially transparent layer,
   wherein at least a portion of visible light emitted by the second luminous layer passes through the second partially transparent intermediate layer, passes through the second partially transparent layer, and exits the second partially transparent layer so as to backlight the second partially transparent layer, and wherein the partially transparent layer and the second partially transparent layer are at an angle to one another and form a common edge, such that the luminous layer comprises one luminous strip of the plurality of luminous strips at the common edge, and the second luminous layer comprises one second luminous strip of the plurality of second luminous strips at the common edge.

3. The visible built-in component according to claim 1, wherein the partially transparent layer is the partially transparent stone layer.

4. The visible built-in component according to claim 3, wherein the partially transparent stone layer comprises a mineral.

5. The visible built-in component according to claim 3, wherein the partially transparent stone layer comprises a rock.

6. The visible built-in component according to claim 3, wherein the partially transparent stone layer comprises a composite material, and wherein the composite material comprises greater than 30% stone.

7. The visible built-in component according to claim 3, wherein the partially transparent stone layer is made of white onyx.

8. The visible built-in component according to claim 1, wherein the partially transparent layer is the partially transparent glass layer.

9. The visible built-in component according to claim 8, wherein the partially transparent glass layer comprises a translucent pane of glass.

10. The visible built-in component according to claim 1, wherein the distance, a, is in a range of between 19 mm and 23 mm.

11. The visible built-in component according to claim 1, wherein the luminous layer comprises a support plate, and wherein the luminous strips of the plurality of luminous strips are embedded in the support plate.

12. The visible built-in component according to claim 11, wherein the support plate comprises a support plate honeycomb structure.

13. The visible built-in component according to claim 1, wherein the luminous strips of the plurality of luminous strips are each surrounded by heat-shrink tubing.

14. The visible built-in component according to claim 1, wherein the partially transparent intermediate layer is made of a polymer.

15. The visible built-in component according to claim 1, wherein the partially transparent intermediate layer has a thickness, d, in a range of between 15 mm and 20 mm.

16. The visible built-in component according to claim 1, wherein the partially transparent layer is a partially transparent stone layer or a partially transparent frosted glass layer.

17. The visible built-in component according to claim 1, wherein the plurality of luminous strips is a plurality of LED luminous strips, and wherein each LED luminous strip of the plurality of LED luminous strips comprises multiple spaced apart LED elements.

18. The visible built-in component according to claim 17, wherein the intermediate layer honeycomb structure has a first surface, a second surface, and a plurality of honeycomb bores extending from the first surface to the second surface, wherein the intermediate layer further comprises a cover plate and a base plate, wherein the base plate is bonded to the first surface of the intermediate layer honeycomb structure and the cover plate is bonded to the second surface of the intermediate layer honeycomb structure, wherein the base plate is bonded to the luminous layer and the cover plate is bonded to the partially transparent layer, and wherein at least a portion of visible light emitted by the luminous layer passes through the base plate, passes through the intermediate layer honeycomb structure, passes through the cover plate, passes through the partially transparent layer, and exits the partially transparent layer so as to backlight the partially transparent layer.

19. The visible built-in component according to claim 18, wherein the partially transparent intermediate layer acts as a diffuser, such that the at least the portion of visible light emitted by the luminous layer that passes through the base plate, passes through the intermediate layer honeycomb structure, passes through the cover plate, passes through the partially transparent layer, and exits the partially transparent layer evenly backlights the partially transparent layer so that the partially transparent layer is evenly illuminated.

20. An aircraft, comprising:

at least one visible built-in component, wherein each visible built-in component of the at least one visible built-in component comprises:

a partially transparent layer, wherein the partially transparent layer is a partially transparent stone layer or a partially transparent glass layer;

a partially transparent intermediate layer, wherein the partially transparent intermediate layer comprises an intermediate layer honeycomb structure, and wherein the partially transparent intermediate layer is colourless; and a luminous layer, wherein the luminous layer comprises a plurality of luminous strips, wherein the partially transparent intermediate layer is positioned between the luminous layer and the partially transparent layer, wherein at least a portion of visible light emitted from the luminous layer passes through the partially transparent intermediate layer, passes through the partially transparent layer, and exits the partially transparent layer so as to backlight the partially transparent layer, wherein the luminous strips of the plurality of luminous strips are arranged in parallel, wherein the luminous strips of the plurality of luminous strips are arranged side by side such that luminous strips of the plurality of luminous strips are a distance, a, from adjacent luminous strips of the plurality of luminous strips, and wherein a ratio of the distance, a, and a thickness, d, of the partially transparent intermediate layer is in a range of from 0.5 to 1.5.

* * * * *